July 24, 1928.

L. D. SOUBIER

GLASS FORMING MACHINE

Filed April 8, 1926

INVENTOR
Leonard D. Soubier
BY
J. F. Rule
HIS ATTORNEY

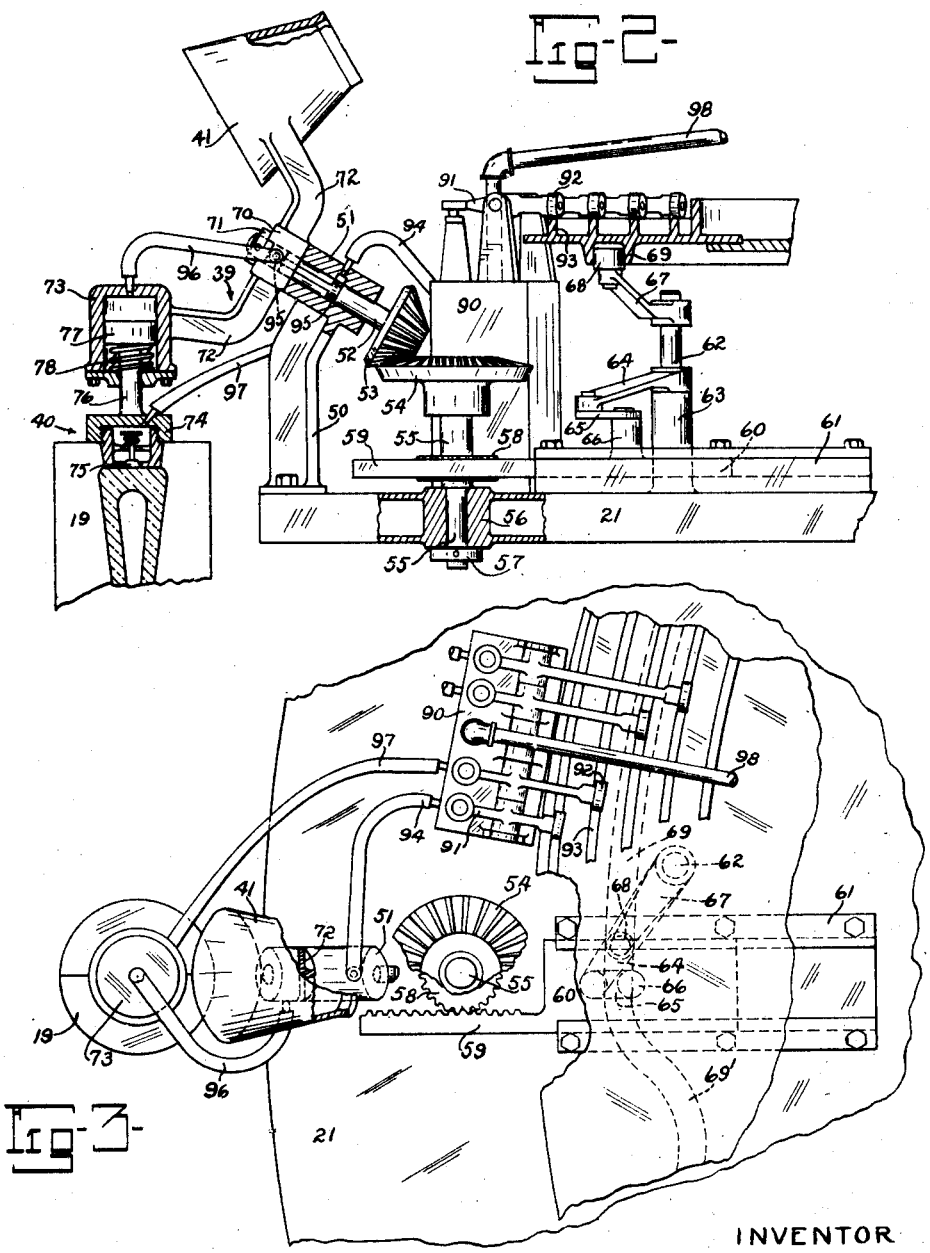

Patented July 24, 1928.

1,678,233

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed April 8, 1926. Serial No. 100,518.

My invention relates to glass forming machines and particularly that type wherein glass is fed by gravity to the blank molds. It is the usual practice in feeding glass to machines of this type to periodically drop gobs or charges of molten glass in the open upper ends of inverted blank molds, such molds being mounted upon a continuously rotating carriage and arranged in an annular series for positioning in succession below the feeding mechanism for reception of charges. Due to the continuous rotation of the carriage and with it the supported blank molds, it becomes necessary to provide a guide funnel or similar device to insure delivery of the charges to the blank molds in the event delivery movement of the charge of glass after being severed, is not accurately synchronized with the movement of the mold carriage. After a charge is received in the blank mold, a blow head is brought into position over the open upper end of the mold, and by means of pneumatic pressure injected through the head, the molten glass within the mold is forced downwardly to cause accurate shaping of the neck portion. The blow head may also be used as a forming plate or mold bottom when the blank is being blown to hollow form by injection of air or the like through the opposite end of the mold.

The present invention is herein shown in connection with a forming machine of the character above indicated and comprises an individual blow head and funnel guide for each blank mold. An object of this invention is to materially simplify mechanism for alternately positioning blow heads and funnel guides over blank molds or the like, eliminate the usual multiplicity of links and other elements which result in a greater or lesser degree of lost motion, and provide a blow head and funnel guide operating mechanism particularly adapted to the type of machine to which it is applied.

Other objects of the invention will appear hereinafter.

In the accompanying drawings:

Fig. 2 is a detail sectional elevation, showing the manner in which the blow head is associated with the blank mold and the means for applying pneumatic pressure to the head.

Fig. 3 is a fragmentary plan view of the parts shown in Fig. 2, portions being eliminated for the sake of clarity.

Figure 1:
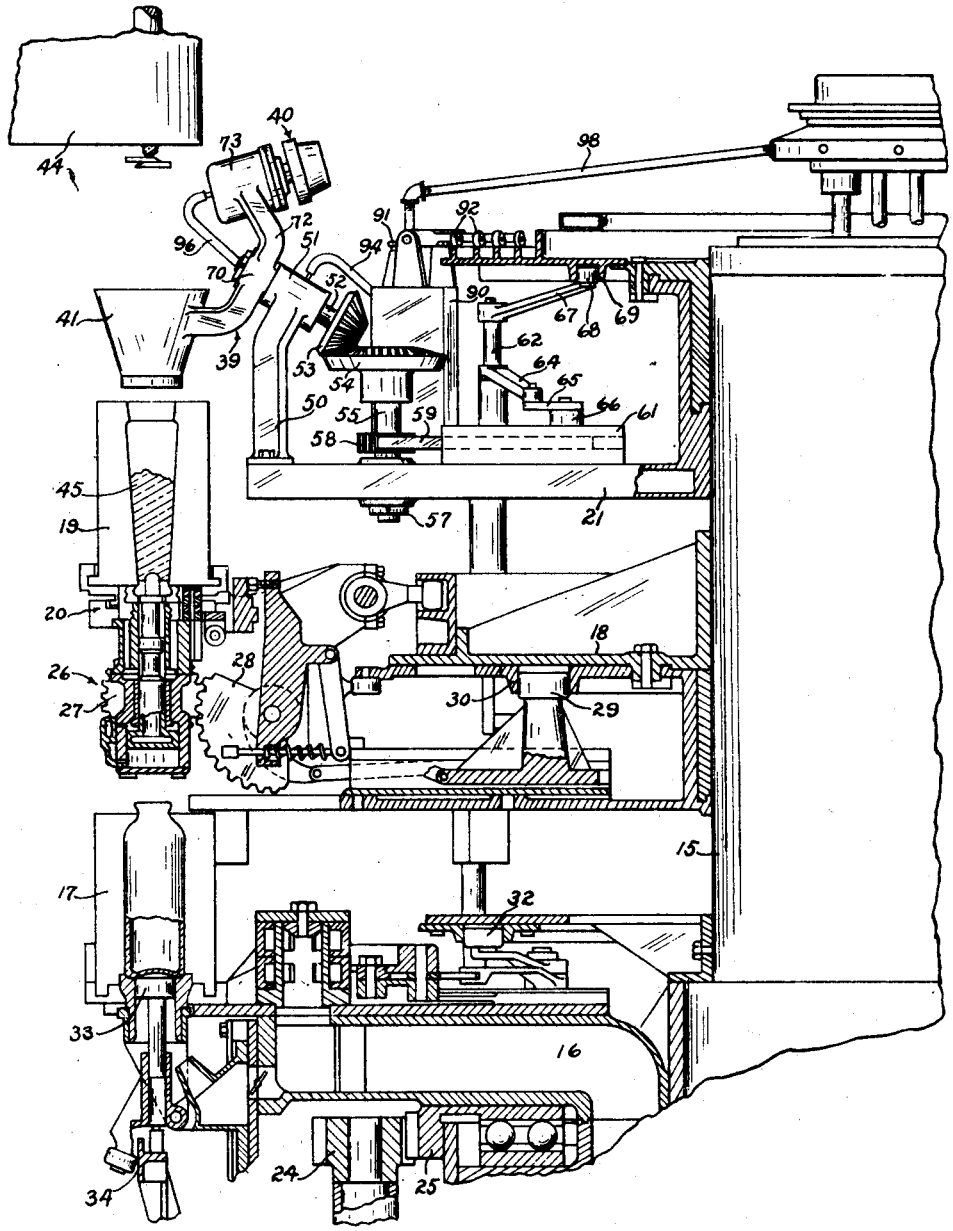
Fig. 1 is a sectional elevation of a glass blowing machine to which my invention is applied, parts being broken away.
Figure 1:
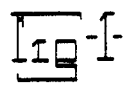

The invention is herein shown as applied to a glass blowing machine such as disclosed in the co-pending application of Albert N. Cramer, for glass forming machines, S. N. 640,386, filed May 20, 1923. It is to be understood, however, that the invention may be adapted to other types of machines.

Having more particular reference to the accompanying drawings, the machine comprises a stationary column 15 on which the mold carriage is mounted for continuous rotation, such carriage comprising a lower section or table 16, on which are supported the finishing molds 17, an intermediate section 18 which carries the blank molds 19 and neck molds 20, and an upper section 21 upon which the mold closing or blow heads 40 and funnel guides 41 are supported. The carriage is continuously rotated by means of a driving pinion or gear 24 running in mesh with an annular or ring gear 25 on the carriage.

The blank molds 19 are arranged in an annular series on the mold carriage, each mold comprising horizontally separable sections. Each mold is in the inverted position as shown in Fig. 1 when it reaches the charging station, the upper end being open at this stage to receive the charge or gob of glass. Further, at this stage, the neck mold 20 is directly beneath and in register with the blank mold. After a charge has been dropped into the blank mold 19, the corresponding blowing head 40 is brought into position to close the upper end of the mold, and air is supplied under pressure in a manner to be hereinafter set forth for the purpose of compacting the glass in the blank mold and neck mold.

A head 26 carrying the blank mold and neck mold is then rotated about a horizontal axis to swing the blank mold 19 and neck mold 20 downwardly as a unit. This downward swinging is effected by means of a pinion 27 driven by a gear segment 28, having an operating connection with a cam roll 29, running on a stationary cam track 30. After the blank mold 19 has been swung downwardly, it is opened and reinverted, leaving the blank or parison suspended from the neck mold 20. The finishing mold sections 17 at this stage are closed around the blank, said sections being actuated by a cam 32, after which the blank is blown to its final form. Upon completion of the final blowing operation, the finishing mold 17 opens and the mold bottom 33 is tilted to discharge the bottle, such tilting of the bottom being controlled by a stationary cam 34.

The charges or gobs of glass are supplied from an automatic feeder 44 which may be of the usual or any preferred construction, and which operates in synchronism with the mold carriage movement to drop a charge 45 of molten glass into each blank mold 19 as the latter passes beneath the feeder. The charge is guided into the mold 19 by the aforementioned funnel guide 41 which, at this stage, is directly over or in register with the blank mold.

The funnel guide and blowing head 40 are rigidly interconnected by an intermediate frame 39 and are adapted for periodic movement, preferably oscillatory, around a radially outwardly inclined axis in such timed relation to the rotation of the mold carriage that the funnel 41 is disposed in vertical alignment with and at the upper or charge receiving end of the blank mold 19 when the latter is beneath the feeder and in a position to receive a charge of molten glass delivered from the feeder or forehearth 44. Continued rotation of the mold carriage after reception of the charge by the blank mold 19, causes an oscillatory movement of the frame or carrier 39 around said inclined axis, and thereby positions the blowhead 40 over the open upper end of the blank mold for a purpose which will be hereinafter apparent. It may be here noted that due to inclination of the axis about which the aforementioned frame oscillates, either the funnel guide 41 or the blowing head 40 may assume an active position over a blank mold 19 while the other element is so disposed as to be unobstructive to functioning of other associated parts and at the same time occupies a position relative to the mold, such as requires a very slight movement by the particular element to attain an active position over the mold. In mounting these oscillatory frames, one of which is associated with each mold, I bolt or otherwise secure to the upper section 21 of the mold carriage, an upstanding angular bracket 50 whose upper end is formed with a radially outwardly inclined bearing 51. In this bearing 51, is journalled a shaft 52 upon whose inner or lower end is mounted a bevel gear 53 having driving connection with a bevel gear 54 at the upper end of a vertical shaft 55. The lower end of this shaft 55 is journalled in a bearing 56, formed in the upper section 21, and is held in this bearing by means of a retaining collar or lock ring 57.

This shaft 55 also carries for rotation therewith, a spur gear 58 or pinion which is periodically oscillated, due to its engagement with a rack bar 59 projecting longitudinally from one end of a slide plate 60. This slide plate 60, as will be noted by reference to Figs. 2 and 3, is horizontally movable in guides 61 bolted or otherwise attached to the upper face of the upper section 21 of the mold carriage.

Periodic horizontal radial reciprocation of the slide plate 60 and consequent intermittent oscillation of the inclined shaft 52, are attained by a cam and rocker arm mechanism, including a rock shaft 62 whose lower end is journalled in a bearing 63 rising from the upper side of the top section 21 of the mold carriage. A rock arm 64 is fixed to the rock shaft 62, and is connected by means of a link 65 to a stud 66 rising from and preferably integrally formed with the slide plate 60. At the upper end of the rock shaft 62, is a second rock arm 67, having a cam roll 68 at its outer end engaging a stationary cam track 69. This stationary cam track 69, as will be understood by reference to Figs. 1 and 3, is formed with an offset or bend 69' at a point so disposed with respect to the glass feeding mechanism 44, that when a blank mold is positioned to receive a charge of glass from the feeder, the slide 60 will be in its innermost position and the funnel guide 41 positioned over the blank mold.

Fixed to the upper end of the inclined shaft 52, is a transverse blow head and funnel guide support or carrying frame 39, which consists of a substantially U-shaped member whose medial portion 70 is enlarged for attachment to the shaft and is held thereon by a retaining ring or collar 71. Oppositely directed, diametrically disposed, arms 72 of this frame 39 have their outer portions disposed obliquely to the axis of the inclined shaft and have mounted thereon, the closing or blow head 40 and funnel guide 41. The funnel guide 41 is in the form of an open frusto-conical element, though obviously other forms of guide means may be substituted therefor.

The blowing head 40, as is customary, is of hollow formation and includes a closure head portion 74, and a pressure controlled poppet valve 75. A stem or piston rod 76 rises from the head portion 74 and has operative connection with the piston 77 of the motor 73. The housing or cylinder of this motor 73 is preferably of integral formation with one arm 72. A coil expansion spring 78 is disposed between a removable head of the motor 73 and the reciprocable piston, and acts to normally raise the piston and maintain the closing or blowing head 40 in its uppermost position where it will be clear of the mold to permit free oscillation of the frame 39 as desired. This motor 73, as will be noted by reference to Fig. 2, serves to effect positive connection as between the blowing head 40 and the transverse frame 39.

Means for controlling the supply of air under pressure to the blowing head is attained through mounting upon the upper section 21 of the mold carriage, an air box 90 provided with a set of valves, each of which is adapted to be operated by a valve control lever 91 which carries at one end, a cam roll 92 contacting with a stationary cam track 93. Simultaneously with positioning of the blowing head 40 over a blank mold 19, one of the stationary cam tracks 93 acts to rock one of the valve operating levers 91 and permits passage of air under pressure from the air box 90 by way of a pipe 94, inter-communicating annular grooves 95 in the inclined shaft 52, and a pipe 96 to the closed end of the blow head reciprocating motor 73. The first named pipe 94 has one end communicating with one of the annular grooves 95 in the inclined shaft 52 by way of a radial opening in the inclined bearing 51. The next adjacent valve and operating lever 92, when actuated by one of the stationary cams 93, permits passage of air or the like by way of a pipe 97 to the upper end of the blow head. The pressure of this air is sufficient to unseat the poppet valve 75 and compact the glass which has just been delivered to the blank mold. It may be pointed out that the pressure of air within the air box 90 is maintained constant and is supplied through a pipe 98 whose inner end may be connected to a source of supply of any preferred form.

The operation may be stated as follows:
Assume the charge guiding funnel 41 and the blank mold 19 to be relatively disposed as shown in Fig. 1, wherein it will be noted that the charge or gob 45 of molten glass has been delivered to the blank mold. With rotation of the mold carriage in the usual manner, the cam roll 68 will strike the offset 69′ of the stationary cam track 69, thereby effecting rocking of the rock shaft 62 and consequently causing the rack bar to slide radially outward and oscillate the spur gear 58 and the coacting bevel gears.

Oscillation of the inclined shaft 52 to a predetermined extent, due to a similar movement on the part of the bevel gears 53 and 54, results in a direct reversal of positions of the funnel guide 41 and blowing head 40, so that the blowing head is now positioned directly over and in register with the open charge receiving end of the blank mold 19. At this point, the stationary cam tracks 93 act in succession upon a pair of closely related valve operating levers 91 to inject air under pressure into the blowing head control motor 73 to engage the blowing head with the blank mold as shown in Fig. 2, and then direct air under pressure into the blank mold 19 by way of the blowing head 40 for the purpose of compacting the molten glass which has just been delivered to the blank mold through the funnel guide. Each of an annular series of blank molds 19 is equipped with an individual funnel guide 41, blowing head 40, and the other associated elements set forth. By reference to Fig. 1, it will be noted that due to the inclination of the shaft 52, which oscillatively carries the funnel guide and blowing head supporting frame 39, the element which is not positioned for operative association with the blank mold, is so disposed that it does not form an obstruction interfering in any manner with the operation of other elements closely associated therewith. Further, the comparatively direct connection between the stationary cam track 69, and the oscillatory frame 39 which carries the funnel guide 41 and blowing head 40, serves to minimize the presence of lost motion and constitutes an obviously highly desired positive driving mechanism.

Manifestly, certain changes in the minor details of construction may be resorted to as may fall within the spirit and scope of the invention as claimed.

What I claim is:

1. A glass forming machine comprising in combination, a rotary mold carriage, a mold thereon open at its upper end to receive a charge of glass, a guide for directing the charge into the mold, a carrier for the guide, mounted on the mold carriage and means to oscillate the carrier about a non-vertical axis and thereby alternately lift and lower the guide out of and into a position over and in register with the mold.

2. A glass forming machine comprising in combination, a mold open at its upper end to receive a charge of glass, a guide for directing the charge into the mold, a mold closing head, a carrier for the guide and head, and means to oscillate the carrier about a non-vertical axis extending between the guide and head and thereby move the guide and head alternately into position over the mold.

3. A glass forming machine comprising in combination, a mold open at its upper end to receive a charge of glass, a guide for directing the charge into the mold, a mold closing head, a carrier for the guide and head, means to oscillate the carrier about a non-vertical axis extending between the guide and head and thereby move the guide and head alternately into position over the mold, and means to move said head relatively to the carrier vertically into and out of mold closing position.

4. A glass forming machine comprising in combination, a rotating mold carriage, a mold thereon, a shaft mounted on said carriage with its axis inclined to the axis of the mold carriage, a guide mounted on the shaft for directing charges of glass into the mold, and means controlled by the movement of the carriage to revolve the guide about the axis of the shaft into and out of charge guiding position over the mold.

5. A glass forming machine comprising in combination, a rotating mold carriage, a mold thereon, a shaft mounted on said carriage with its axis inclined to the axis of the mold carriage, a mold closing head mounted on the shaft, and means controlled by the movement of the carriage to revolve the mold closing head about the axis of the shaft into and out of a position over the mold.

6. A glass forming machine comprising in combination, a rotating mold carriage, a mold thereon, a guide for directing charges of glass into the mold, a mold closing head, a carrier supporting the guide and mold closing head, and means controlled by movement of the carriage to oscillate the carrier about a non-vertical axis and thereby move the guide and said head alternately into position over the mold.

7. A glass forming machine comprising in combination a movable mold carriage, a mold thereon, charge guiding means, a motor rigidly connected and maintained in fixed spaced relation to the charge guiding means, a mold closing head carried by the motor, a radially outwardly inclined shaft mounting the connected charge guiding means and motor, means to periodically oscillate the shaft for alternately positioning the charge guiding means and closing head over the mold, and means to actuate the motor to move the head into and out of engagement with the mold.

8. A glass forming machine comprising in combination a movable mold carriage, a mold thereon, charge guiding means, a motor rigidly connected and maintained in fixed spaced relation to the charge guiding means, a mold closing head carried by the motor, a radially outwardly inclined shaft carried by the mold carriage and mounting the interconnected charge guiding means and motor, rack and gear mechanism to oscillate the shaft, and means operating in synchronism with the mold carriage movement to periodically actuate the rack and gear mechanism to move the charge guiding means and closing head alternately into position over the mold.

9. A glass forming machine comprising in combination a movable mold carriage, a mold thereon, charge guiding means, a motor rigidly connected and maintained in fixed spaced relation to the charge guiding means, a blowing head carried by the motor, a radially outwardly inclined shaft carried by the mold carriage and mounting the interconnected charge guiding means and motor, rack and gear mechanism to oscillate the shaft, and means operating in synchronism with the mold carriage movement to periodically actuate the rack and gear mechanism to move the charge guiding means and blowing head alternately into position over the mold.

10. In a glass forming machine, the combination of a movable mold carriage, a mold thereon, a radial outwardly inclined shaft oscillatively mounted on said carriage, a frame fixed transversely of and to the outer end of said shaft, a charge guide and blow head mounted at opposite ends of said frame, and mechanism for periodically oscillating the shaft and alternately positioning the guide and head over the mold.

11. In a glass forming machine, the combination of a continuously rotating mold carriage, a mold thereon, a radially outwardly inclined bearing mounted upon the mold carriage in proximity to the mold, a shaft journalled in the bearing, a frame arranged transversely of the outer end of the shaft, devices carried at opposite ends of the frame for alternate engagement with one end of the mold, and means for periodically oscillating the shaft and frame for alternately actively positioning the devices over the mold in timed relation with movement of the mold carriage.

12. In a glass forming machine, the combination of a continuously rotating mold carriage, a mold thereon, a radially outwardly inclined bearing mounted on the mold carriage in proximity to the mold, a shaft journalled in the bearing, a funnel guide and blowing head spaced from and connected to the outer end of said shaft at diametrically opposed points, said funnel guide and blowing head being oblique to the axis of said shaft and adapted for alternate active positioning over the mold, and means for periodically oscillating the shaft in timed relation to the mold carriage movement to effect said alternate positioning of the funnel guide and blowing head over the mold.

13. In a glass forming machine, the combination of a continuously rotating mold carriage, a mold thereon, a radially outwardly inclined bearing mounted on the mold carriage in proximity to the mold, a shaft journalled in the bearing and having a pair of longitudinally spaced annular ways and a longitudinal way forming communication between said annular ways, a funnel guide, a motor, a blowing head carried by the motor, said guide and head arranged at diametrically opposed points and rigidly connected to the outer end portion of said shaft, means for periodically oscillating the shaft to alternately actively position the funnel guide and blowing head over the mold, and means including said annular ways for supplying air under pressure to the motor.

14. A glass forming machine comprising in combination a charge guide, a blow head, and means for alternately positioning the guide and blow head over the charge receiving end of a blank mold, comprising a frame interconnecting the guide and head, and means to periodically oscillate the frame about a non-vertical axis extending between the head and guide.

Signed at Toledo, in the county of Lucas and State of Ohio, this 6th day of April, 1926.

LEONARD D. SOUBIER.